Aug. 9, 1955 W. P. SCHMITTER 2,714,824

AIR COOLED POWER TRANSMISSION

Filed June 25, 1952 4 Sheets-Sheet 1

INVENTOR.
Walter P. Schmitter
BY
Erwin B. Piring
ATTORNEY

Aug. 9, 1955 W. P. SCHMITTER 2,714,824

AIR COOLED POWER TRANSMISSION

Filed June 25, 1952 4 Sheets-Sheet 2

INVENTOR
Walter P. Schmitter
BY
Erwin B. Kiring
ATTORNEY

Aug. 9, 1955 W. P. SCHMITTER 2,714,824

AIR COOLED POWER TRANSMISSION

Filed June 25, 1952 4 Sheets-Sheet 3

INVENTOR
Walter P. Schmitter
BY
Erwin B. Ciring
ATTORNEY

AIR COOLED POWER TRANSMISSION

Filed June 25, 1952 4 Sheets-Sheet 4

INVENTOR
Walter P. Schmitter
BY
Erwin B. Rising
ATTORNEY

United States Patent Office 2,714,824
Patented Aug. 9, 1955

2,714,824

AIR COOLED POWER TRANSMISSION

Walter P. Schmitter, Wauwatosa, Wis., assignor to The Falk Corporation, Milwaukee, Wis.

Application June 25, 1952, Serial No. 295,487

7 Claims. (Cl. 74—606)

This invention relates to an air cooled power transmission for providing improved operating conditions in instances where the transmission is, of necessity, disposed in close proximity to equipment which operates at a relatively high temperature.

Preheaters used in conjunction with boiler furnaces, such as those in power plants, or furnaces used in processing in the chemical, petroleum or similar industries provide an excellent illustration of one type of equipment to which the air cooled power transmission, of the present invention, may be aptly applied to overcome a common cause of failure of previously designed transmissions to give continued trouble-free service over extended periods of time in the environment of high temperature operating conditions. The use of air preheaters, in conjunction with the above mentioned types of furnaces, produces numerous well known benefits in flame stability, fuel saving, and general increased efficiency and capacity.

In operation, preheaters are adapted to function in a manner capable of delivering preheated air to the furnace at temperatures ranging from 500° to considerably above 600° Fahrenheit. Many of these preheaters are of the continuous, counterflow, regenerative type which include a chamber housing a driven rotor containing heat exchange means adapted, during a portion of an operating cycle, to absorb heat from the exhaust gases of the furnace as they pass through a multiplicity of relatively narrow channels delineated by closely spaced heat absorbing metal plates arranged to afford the minimum resistance to the flow of the exhaust gases and adapted, during another portion of its operating cycle, to transmit the absorbed heat to incoming air to preheat the same to the desired high temperature prior to its introduction into the furnace.

The size and nature of the construction of most preheaters is such that the source of power and the speed reducing transmission required for effecting the relatively slow movement of the rotor must, of necessity, be positioned in close proximity to the preheater with the result that the motor and transmission mechanism function under extremely high temperatures which are very deleterious to their satisfactory continued operation over the extended periods of time demanded by the nature of the operation of the device.

The primary object of the present invention resides in the provision of a new and improved air cooled power transmission constructed in a manner to permit its effective and efficient operation over extended periods of time in the environs of temperatures considerably higher than previous types of uncooled transmissions were able to withstand.

Another object of the present invention resides in the provision of a new and improved air cooled transmission which includes a power source, a casing housing a transmission comprising a power input shaft, a driven shaft, a plurality of speed reducing gear sets interposed between the shafts, a lubricant chamber and a channel supplied with air from an impeller for effecting the high velocity movement of air through the channel in wiping contact with the interior of the casing and wall of the lubricant chamber to dissipate heat therefrom to greatly reduce the normal operating temperature of the transmission in spite of its close proximity to the preheater device.

Another object of the present invention resides in the provision of a new and improved air cooled power transmission mechanism containing a plurality of speed reducing gear sets combined in a manner to afford a compact, sturdy and heavy duty transmission capable of ready application in driving relationship with a high temperature, relatively large, slow-moving driven rotor element of the preheater device.

Another object of the present invention resides in the provision of a new and improved air cooled power transmission mechanism containing a plurality of speed reducing gear sets combined in a manner to afford a compact, sturdy and heavy duty transmission capable of ready application in driving relationship with a high temperature, relatively large, slow-moving driven rotor element; the transmission mechanism including a casing provided with a cavity in which a driven impeller is mounted and an air channel for directing the air from the impeller in wiping contact with the interior of the casing to effectively reduce the operating temperature of the transmission through the medium of the circulating air.

Another object of the present invention resides in the provision of a new and improved air cooled power transmission mechanism including a transmission housing containing an air channel and impeller means operatively associated with the high speed power input shaft of the transmission to afford a medium by which a large volume of air is passed through the air channel at high velocity to absorb heat and materially reduce the operating temperature of the transmission mechanism.

A more specific object of the present invention resides in the provision of a new and improved air cooled power transmission mechanism including a high speed power input shaft, a power output shaft, a plurality of speed reducing gear sets interposed between the shatfs, a housing containing said mechanism and including an air channel arranged to direct a large volume of air, supplied from an impeller driven by the high speed shaft of the transmission, through a delineated path within the casing to materially reduce the operating temperature of the transmission.

Another more specific object of the present invention resides in the provision of a new and improved air cooled power transmission mechanism including a high speed power input shaft having its opposite ends projecting from the transmission housing to afford means for effecting its rotation selectively through the medium of either an electric motor or an air motor coupled to the respective ends of the power input shaft.

Other objects and advantages will become apparent from the following description of an illustrative embodiment of the present invention shown in the accompanying drawing.

Figure 3:
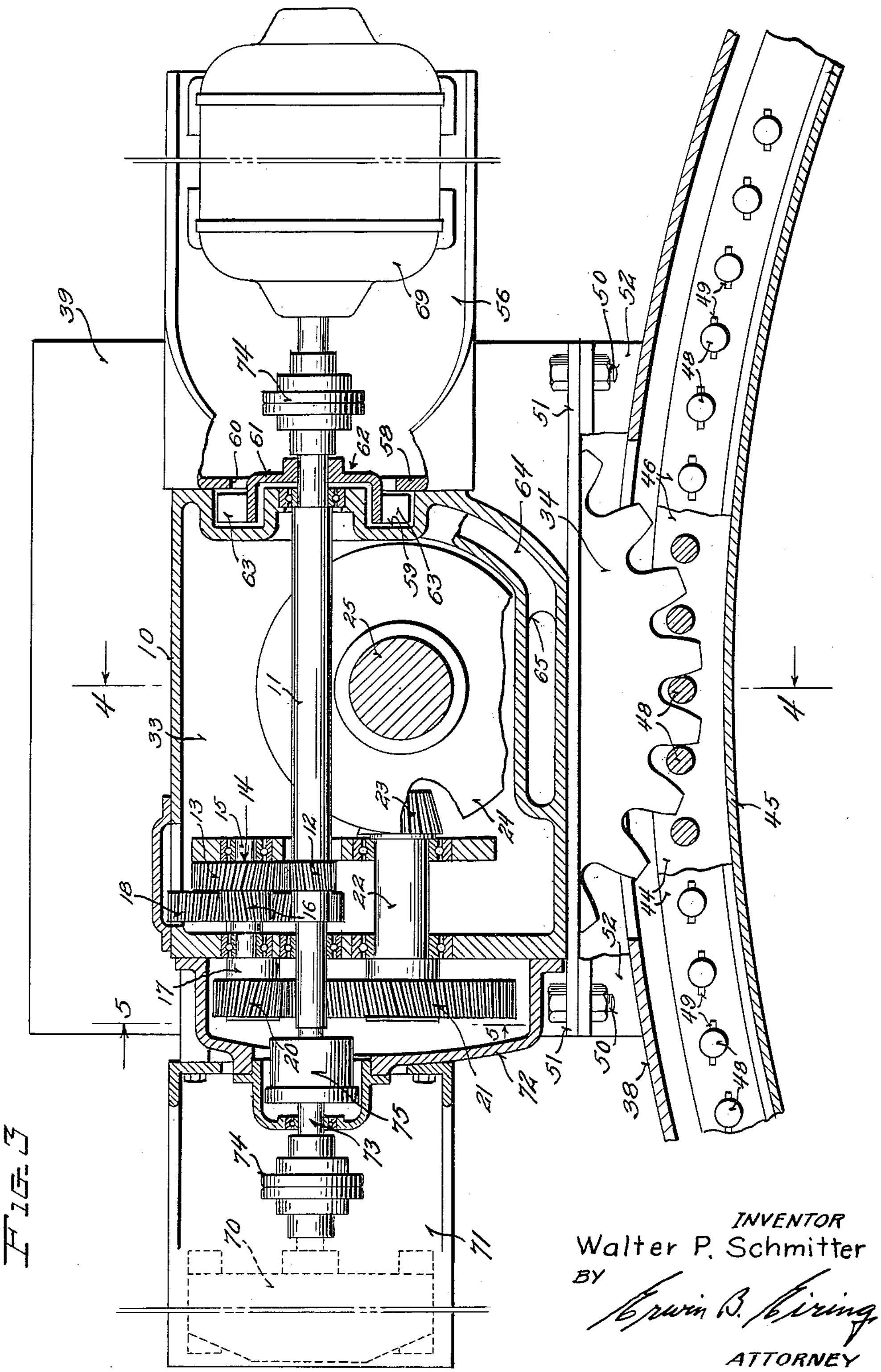
Fig. 3 is a longitudinal horizontal sectional view, taken on the line 3—3 of Fig. 2 and showing the several speed reducing gear sets of the transmission together with a portion of the air circulating channel which serves to reduce the operating temperature of the transmission.
Figure 4:
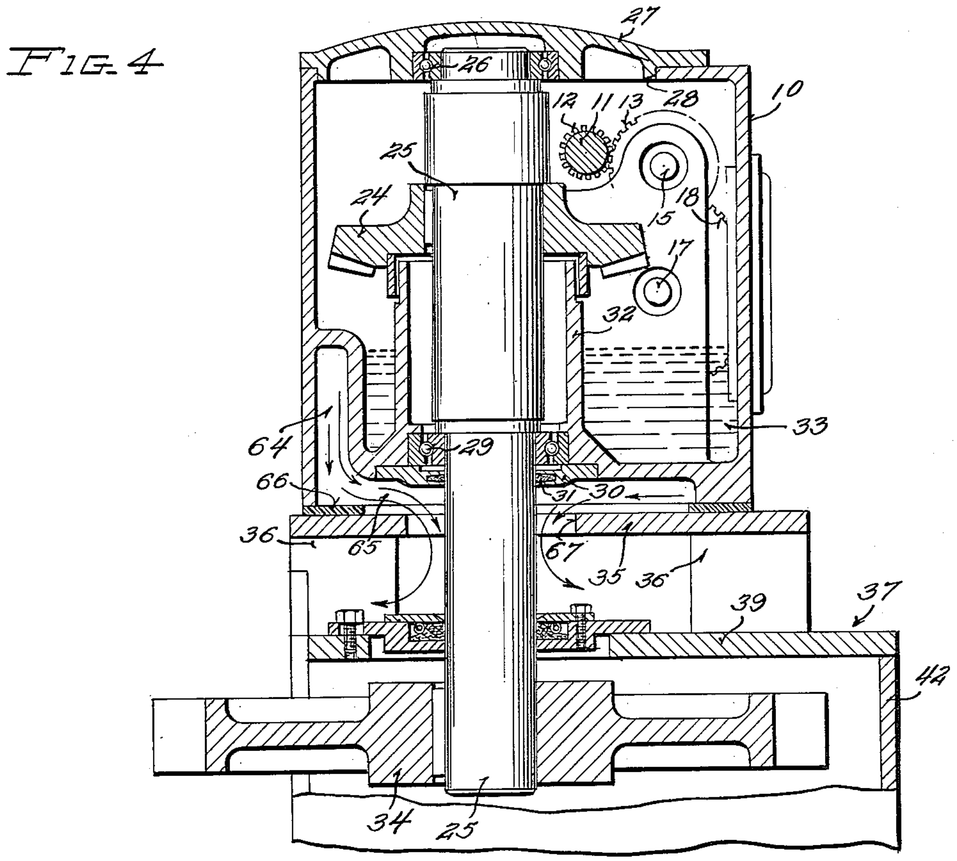
Figure 5:
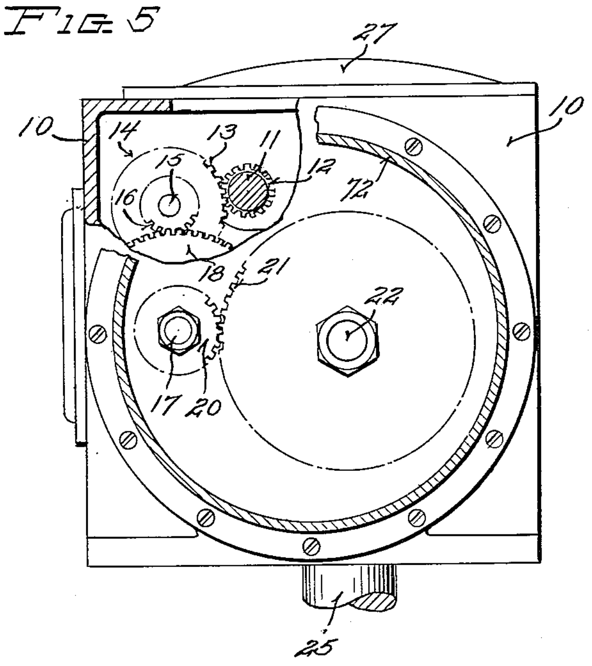

Fig. 4 is a vertical transverse sectional view, taken on the line 4—4 of Fig. 3 and showing the lubricant containing chamber in the casing and the path of travel of the circulating air beneath the lubricant containing chamber and its exhaust over the top surface of the transmission mounting bracket; and Fig. 5 is a vertical transverse sectional view taken substantially along the line 5—5 of Fig. 3 and showing the compact arrangement of the several gear sets.

The embodiment of the present invention, chosen for illustrative purposes in the accompanying drawing, discloses an air cooled power transmission mechanism constructed in accordance with the teachings of the present invention and utilized in conjunction with the driving of a ring gear carried by a relatively large diameter rotor element forming the moving part of a preheater device normally used in conjunction with boiler furnaces or furnaces used in processing of materials in various industries.

One reason for the choice of a preheater device is to illustrate the aptitude of the present air cooled power transmission mechanism for service in close proximity to a high temperature device, the temperature of which is normally far above that which the usual or uncooled transmission mechanism is capable of withstanding over protracted periods of continuous operation, without incident breakdowns due to various causes resulting from the high temperature surrounding the transmission mechanism.

The air cooled power transmission mechanism of the present invention has proved itself capable of effective and efficient operation where previous devices have failed to withstand long and continuous operation under the severe operating conditions imposed by reason of its close proximity to the high temperature of the preheater.

Referring more particularly to Fig. 3 of the accompanying drawing, it will be noted that the air cooled power transmission mechanism comprises a hollow casing 10 adapted to contain or support a power transmission including a power input shaft 11 journaled for free rotation in suitable antifriction bearings mounted in aligned openings disposed at opposite ends of the casing 10. A pinion 12 formed integral with or keyed to the power input shaft 11 meshes with a gear 13 of a couplet 14 carried by a countershaft 15 which is journaled for free rotation in a pair of antifriction bearings disposed adjacent the ends of the shaft 15 and mounted respectively in the wall and a partition of the casing 10. The gear couplet 14 also includes a pinion 16 to transmit power from the shaft 11 to a second countershaft 17 through the meshing engagement of the pinion 16 with a mating gear 18 carried by a shaft 17 journaled in antifriction bearings and provided with a pinion 20 disposed exteriorly of the casing 10. The pinion 20 meshes with a mating gear 21 preferably keyed to a stub shaft 22 having its intermediate portion mounted in a pair of axially spaced antifriction bearings supported in the casing 10 in a manner similar to the previously mentioned bearings. The inner end of the stub shaft 22 comprises a bevel pinon 23 which meshes with a bevel gear 24 keyed to a vertically disposed shaft 25 journaled for free rotation at its upper end in an antifriction bearing 26 mounted in a cover 27 (Fig. 4) adapted to form a closure for an opening 28 formed in the top of the casing 10. A thrust bearing 29 disposed below the bevel gear 24 is retained in the casing 10 by the application of a plate 30 to the bottom surface of the casing 10. A suitable oil seal 31 carried by the plate 30 cooperates with the shaft 25 to prevent oil leakage therefrom. It should be noted at this time that the portion of the shaft 25 disposed between the bevel gear 24 and the bottom of the casing 10 is surrounded by a cylindrical wall 32 which cooperates with the casing 10 to delineate a lubricant containing chamber 33. The lower end of the shaft 25 projects beyond the bottom of the casing 10 to serve as a mounting means for a driving gear 34 adapted to be secured to the lower extremity of the shaft 25 after the casing 10 has been mounted on a plate 35 supported on legs 36 which also form an integral part of a supporting bracket 37, which in turn is secured to a stationary wall or casing element 38 forming a part of the preheater device.

Figure 2:
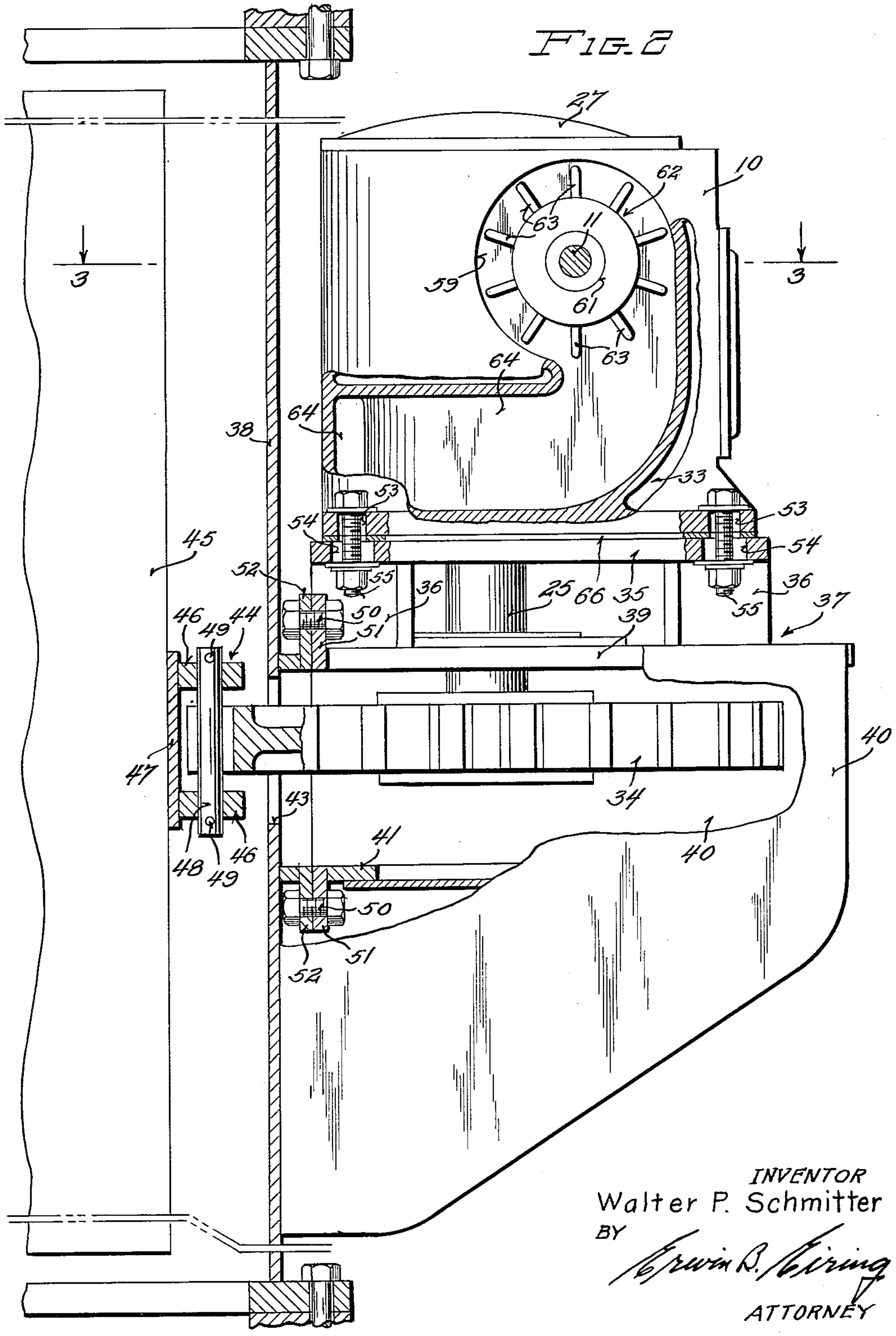
Fig. 2 is a vertical transverse sectional view taken substantially on the line 2—2 of Fig. 1 with parts broken away and shown in section to more clearly illustrate certain structural details.

The supporting bracket structure 37 (Fig. 2) includes an intermediate plate 39, a pair of side plates 40 and a lower plate 41 disposed in parallel spaced relationship with the plate 39 to partially enclose the driving gear 34 mounted on the lower extremity of the shaft 25. A plate 42 forms a closure for the forward end of the compartment housing the gear 34 and the rearward end of the gear housing compartment is open to permit a portion of the gear 34 to extend through an opening 43 in the casing element 38 of the preheater device to expose the toothed portion of the gear 34 and permit its positioning in meshing engagement with a ring gear element 44 which surrounds a rotor 45 forming the driven part of the preheater device. The ring gear element 44 includes a pair of vertically spaced ring members 46 respectively secured in any approved manner, such as welding, to a supporting ring 47 surrounding the rotor 45 and secured thereto by means of welding. The ring gear 44 is formed by a plurality of circumferentially spaced vertically disposed pins 48 adapted to be releasably retained in aligned pairs of holes in the spaced ring members 46 by the application of horizontally disposed locking pins insertable through holes in the respective pins 48 and arranged to contact either the upper or lower surface of the ring members 46 to prevent axial movement of the pins 48 in the rings 46.

The bracket assembly 37 is releasably retained in proper position with respect to the casing element 38 by the application of a plurality of anchoring bolts 50 passed through aligned holes in mounting flange members 51 and 52 respectively carried by the mounting bracket 37 and the casing element 38 of the preheater device.

The proper meshing relationship between the teeth of the gear 34 and the pins 48 of the ring gear element 44 is obtained through the adjustable positioning of the casing 10 on the plate 35 of the mounting bracket structure 37. To effect the adjustable positioning of the casing 10 on the plate 35, the mounting pads on the casing 10 are provided with slots 53 disposed in aligned relationship with similar slots 54 formed in the plate 35. The respective pairs of aligned slots 53 and 54 serve to receive anchoring bolts 55 which may be tightened to releasably retain the casing 10 in properly adjusted position upon the plate 35 to insure the proper meshing engagement between the driving gear 34 and the driven ring gear element 44 carried by the rotor 45 of the preheater device.

Figure 1:
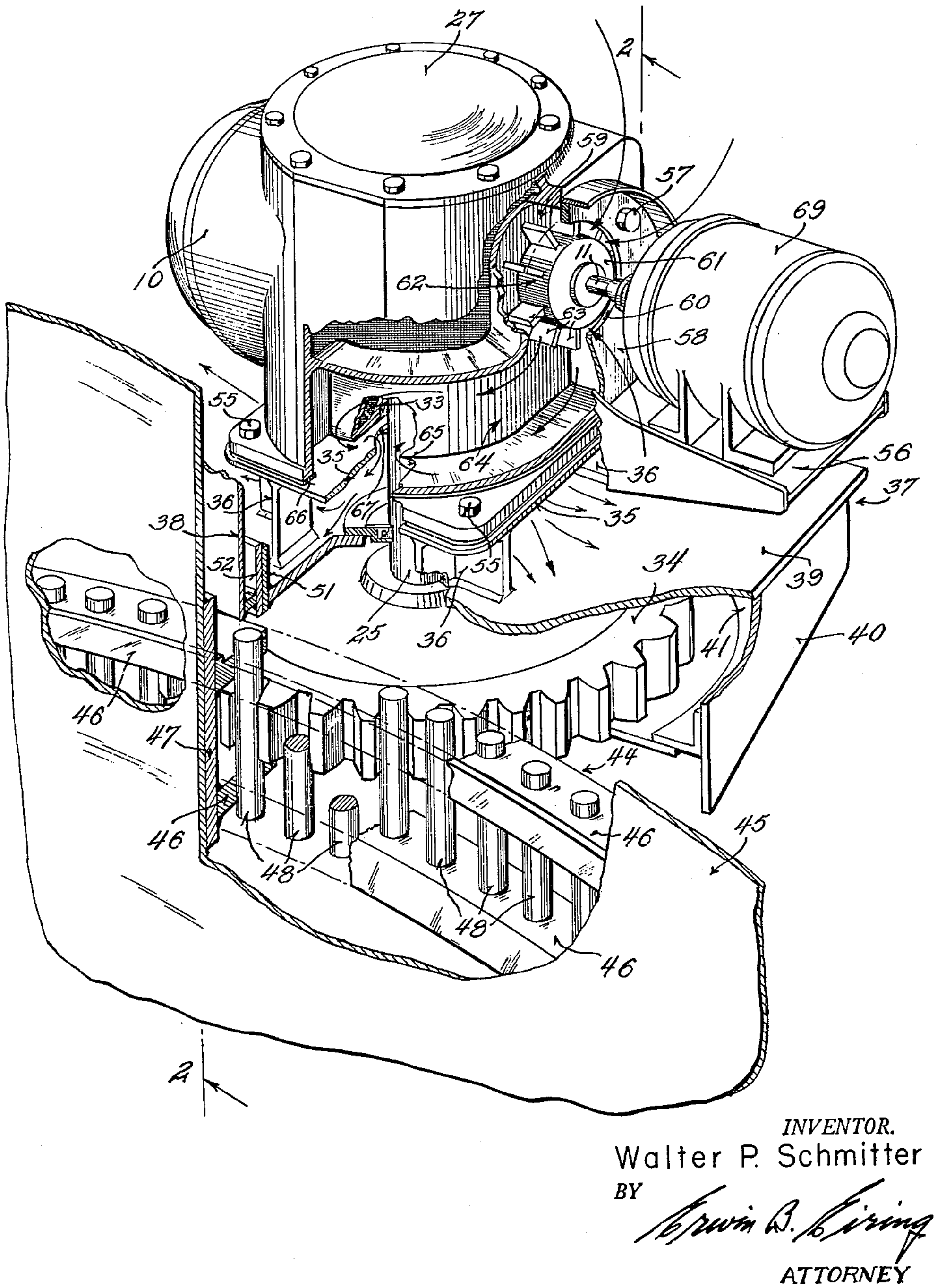
Figure 1 is a perspective view of an air cooled transmission, constructed in accordance with the teachings of the present invention, mounted in driving relationship with the rotor element of a preheater; portions of the structure being broken away and shown in section to better illustrate the structural arrangement of certain of the elements of the device.

Referring more particularly to Figs. 1 and 3 of the drawing, it will be noted that a motor mounting bracket 56 is secured to one end wall of the casing 10 by means of cap screws 57. The motor mounting bracket includes a vertically arranged end wall 58 which forms a partial closure for an impeller housing cavity 59 formed in the casing 10. The end wall 58 of the mounting bracket 56 is provided with an opening 60 arranged to encompass the outwardly projecting hub portion 61 of an impeller 62 which includes a plurality of radially disposed blades 63. The hub portion 61 is adapted to be fixedly mounted on the high speed power input shaft 11 of the transmission mechanism. The opening 60 in the motor mounting bracket 56 provides the intake for air supplied to the impeller 62. A channel 64, formed in the casing 10, leads from the impeller housing cavity 59 to direct air at high velocity along a course between the outer wall of the casing 10 and an inner wall thereof which defines a portion of the lubricant containing chamber 33. The air conducting channel 64 is provided with an outlet opening 65 preferably formed in the base or lowermost wall of the channel 64 to direct the outgoing air to a passage 65 beneath the casing 10 and above the supporting plate 35 of the mounting bracket structure 37. This passage 65 is formed by the presence of a gasket 66 disposed between the bottom surface of the casing 10 and the upper surface of the supporting plate 35. An air discharge opening 67 formed in the plate 35 surrounds the downwardly projecting portion of the shaft 25 to direct the exhaust air over the surface of the plate 39 of the supporting bracket structure 37. It will be noted that the path of travel of the fast moving circulating air through the channel 64 directs it in wiping contact with a large surface area of the lubricant containing chamber 33 of the casing 10 to effect the material reduction of the operating temperature of the entire transmission through its cooling action in absorbing heat as it passes in intimate contact with a large area of the transmission containing casing 10 and that it spreads over the surface of the plate 39 of the mounting bracket structure 37 as it is discharged from the opening 67 in the casing 10.

A horizontally disposed portion of the motor mounting bracket 56 serves as a support for an electric motor 69 which is coupled to the high speed power input shaft 11 of the transmission and provides the power for driving the rotor 45 through the medium of the speed reducing transmission contained in the casing 10.

Referring more particularly to Fig. 3, it will be noted that a stand-by auxiliary drive in the form of an air motor 70 (shown in dotted lines) is provided to effect continued operation of the rotor 45 of the preheater device in the event of a breakdown in the supply of current to the electric motor 69. The air motor 70 is supported on a mounting bracket 71 secured to a cover portion 72 which houses part of the transmission carried by the casing 10. The drive shaft of the air motor is connected to a stub shaft 73 by means of any suitable coupling device 74 and the stub shaft 73 forms one element of an overrunning clutch 75; the other element of which is arranged in driving association with the adjacent end of the power input shaft 11 of the transmission. The overrunning clutch 75 is arranged in a manner to permit free rotation of the power input shaft 11 of the transmission under the driving force of the electric motor 69 when the air motor 70 is at rest. However, in the event of power failure for the electric motor 69, the air motor 70 may be put into operation and the overrunning clutch 75 will become effective to drive the transmission under the influence of the air motor 70.

From the foregoing detailed description of an illustrative embodiment of the present invention, it will be noted that a simple and effective means has been provided in the form of an air cooled transmission mechanism affording a compact unit adapted for positioning and operation in close proximity to a high temperature device to withstand high temperature operation over extended periods of time by reason of the inclusion of a cooling system including an impeller driven from the high speed power input shaft of the transmission and the arrangement of an air conducting channel which is effective on a large area of the casing and lubricant containing chamber to effect the absorption and carrying off of generated heat through the wiping action of the fast moving flow of air supplied by the impeller.

It is to be understood that the air cooled transmission mechanism of the present invention may be applied with equal facility in any installation where it is required to function in the proximity of equipment operating at a temperature which is normally in excess of the capabilities of uncooled transmission mechanisms.

While the invention has been described in considerable detail in the foregoing specification, it is to be understood that various changes may be made in its embodiment without departing from or sacrificing any of the advantages hereinafter claimed.

I claim:

1. In an air cooled power transmission the combination with a casing forming a housing for said transmission and a mounting means for said casing, said transmission including a driving shaft, a driven shaft, speed reducing gearing between said driving and driven shafts, said casing including an impeller housing cavity surrounding said driving shaft, air inlet means in open communication with said impeller housing cavity, an air conducting channel in said casing having one end thereof in open communication with said impeller housing cavity and its other end terminating in an exhaust passage surrounding said driven shaft and remote from said impeller housing cavity and disposed adjacent said mounting means, an impeller housed in said cavity and driven by said driving shaft for circulating air at high velocity through said air conducting channel to reduce the operating temperature of said transmission and exhaust on said mounting means to cool the same.

2. The combination with a power transmission including a casing, a driving shaft journaled in said casing, a driven shaft journaled in said casing, speed reducing gearing between said driving and driven shafts, of a cooling means for reducing the operating temperature of said transmission, said cooling means comprising an air conducting channel in the wall of said casing terminating at one end in an impeller housing cavity surrounding said driving shaft, an impeller mounted on said driving shaft and disposed in said impeller cavity for effecting the flow of air through said channel, and an exhaust opening in said channel remote from said impeller and surrounding said driven shaft whereby the circulation of air through said channel under the influence of said impeller reduces the operating temperature of said transmission by absorbing heat therefrom.

3. The combination with a power transmission including a casing forming a lubricant container, a driving shaft journaled in said casing, a driven shaft journaled in said casing, speed reducing gearing between said driving and driven shafts, of a cooling means for reducing the operating temperature of said transmission, said cooling means comprising an air conducting channel formed in the wall of said casing terminating at one end in an impeller housing cavity surrounding said driving shaft, an impeller mounted on said driving shaft and disposed in said impeller housing cavity for effecting the circulation of air through said channel, and an exhaust opening in said channel surrounding said driven shaft and remote from said impeller whereby the circulation of air through said channel under the influence of said driven impeller reduces the operating temperature of said transmission by absorbing heat from said casing and lubricant containing portion thereof.

4. The combination with a housing including an external transmission supporting bracket and an internal rotatably mounted member adapted to operated at high temperatures, of an air cooled power transmission mechanism mounted on said transmission supporting bracket in close proximity to said rotatably mounted member for driving the same, said transmission comprising a casing, a driving shaft journaled in said casing, a driven shaft journaled in said casing, speed reducing gearing between said driving and driven shafts, an air conducting channel formed in the wall of said casing terminating at one end in an impeller housing cavity surrounding said driving shaft and at its other end in an exhaust opening surrounding said driven shaft, and an impeller disposed in said cavity and mounted on and driven by said driving shaft for circulating air through said channel to reduce the operating temperature of said transmission.

5. The combination with a housing including an external transmission support bracket and an internal rotatably mounted member adapted to operate at high temperatures, of an air cooled power transmission mechanism mounted on said external transmission supporting bracket in close proximity to said rotatably mounted member for driving the same, said transmission comprising a lubricant containing casing, a driving shaft journaled in said casing, a driven shaft journaled in said casing, an air conducting channel in said casing disposed between the wall of said casing and the wall of said lubricant containing portion thereof, said air conducting channel terminating at one end in an impeller housing cavity surrounding said driving shaft and at its other end in an exhaust opening surrounding said driven shaft, and an impeller disposed in said impeller housing cavity and mounted on and driven by said driving shaft for circulating air through said channel to reduce the operating temperature of said transmission.

6. The combination with a housing including an external transmission supporting bracket and an internal rotatably mounted member adapted to operate at high temperatures, of an air cooled power transmission mechanism adjustably mounted on said transmission supporting bracket in close proximity to said rotatably mounted member for driving the same, said transmission comprising a lubricant containing casing including an air channel disposed in said casing, a driving shaft journaled in said casing, a driven shaft journaled in said casing, speed reducing gearing between said driving and driven shafts, said air channel terminating at one end in an impeller housing cavity surrounding said driving shaft and at its other end in an exhaust opening surrounding said driven shaft, and an impeller disposed in said impeller housing cavity and driven by said driving shaft for circulating air therethrough to effect a reduction of the operating temperature of said transmission.

7. The combination with a housing including an external transmission supporting bracket and an internal rotatably mounted member adapted to operate at a high temperature, of an air cooled power transmission mechanism adjustably mounted on said bracket in close proximity to said high temperature member for driving the same, said transmission comprising a casing including a lubricant containing chamber, a driving shaft journaled in said casing, a driven shaft journaled in said casing, speed reducing gearing between said driving and driven shafts, an air conducting channel formed in said casing, said channel being disposed in contact with the wall of said lubricant containing chamber, said air conducting channel terminating at one end in an impeller housing cavity surrounding said driving shaft and at its other end in an exhaust opening surrounding said driven shaft, an impeller disposed in said impeller housing cavity and mounted on and driven by said driving shaft for effecting the circulation of air through said channel whereby the circulation of air through said channel reduces the operating temperature of said transmission and exhausts on said supporting means to cool the same.

References Cited in the file of this patent

UNITED STATES PATENTS

| | | |
|---|---|---|
| 2,391,186 | Noble | Dec. 18, 1945 |
| 2,481,914 | Eastman | Sept. 13, 1949 |
| 2,548,805 | Moir | Apr. 10, 1951 |

FOREIGN PATENTS

| | | |
|---|---|---|
| 420,927 | Great Britain | Dec 11, 1934 |
| 436,416 | Great Britain | Oct. 10, 1935 |